Figure 3:
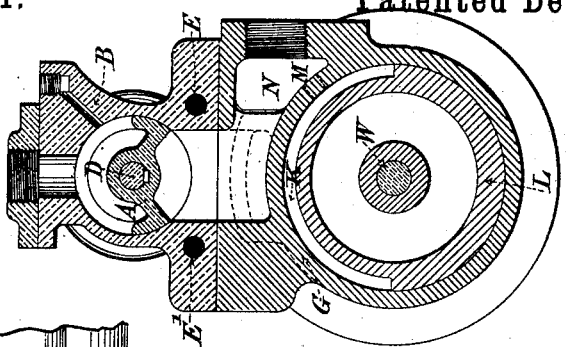

(No Model.)

G. T. PARNELL.
STEAM ACTUATED VALVE.

No. 375,091. Patented Dec. 20, 1887.

Witnesses
Chas. H. Smith
J. Stark

Inventor
Geo. T. Parnell
for Lemuel W. Serrell
atty

N. PETERS, Photo-Lithographer, Washington, D. C.

UNITED STATES PATENT OFFICE.

GEORGE THOMAS PARNELL, OF LONDON, COUNTY OF MIDDLESEX, ENGLAND.

STEAM-ACTUATED VALVE.

SPECIFICATION forming part of Letters Patent No. 375,091, dated December 20, 1887.

Application filed November 27, 1885. Serial No. 184,069. (No model.)

*To all whom it may concern:*

Be it known that I, GEORGE THOMAS PARNELL, a subject of the Queen of Great Britain and Ireland, residing at London, in the county of Middlesex, England, engineer, have invented new and useful Improvements in Steam-Actuated Valves, of which the following is a specification.

My invention relates to improvements in slide-valves; and it consists in a cylindrical valve-chest and a steam-cylinder having ports leading to the valve-chest, combined with a piston within the engine-cylinder having a recess, tubes and ports from the steam-cylinder leading to the ends of the steam-chest, a valve in the steam-chest having circular steam-tight pistons, a rod and feather for the valve to slide upon, ports leading from the interior of the steam-cylinder to the exhaust-port, and grooves in the bottom of the valve-chest, near the ends of the same, of a length greater than the thickness of the valve-moving pistons, for the escape of water of condensation.

The valve is formed in one piece, with an inverted center or bridge-piece and steam-tight circular ends, and is provided with grooves to suit the respective steam-ports in the case, and with faces to cover and uncover the said ports. The circular ends are turned to fit the case, and the valve slides upon a steel bolt or bar passing through the entire length of the same and the ends of case, and said steel bolt or bar has a feather fitted through its entire length, and there are nuts upon the ends of the bolt to hold the same and the cylinder-heads in place. The valve is grooved for the feather, which prevents it turning round in the case. The main cylinder is bored parallel and has a cover fitted to each end with a stuffing-box and gland, through which the piston-rod passes. The cylinder has several ports, two of which have tubes firmly fitted air-tight through the main steam-ports, from the face on which the valve-case is adjusted, into the inside of the cylinder. There are ports for the purpose of actuating the valve in the case; others are for the purpose of admitting the live power into each end of the cylinder; others for the exhaust of the valve and for the exhaust of the main cylinder. The piston is a hollow one, and is formed with a recess on its outer surface for half its circumference, and fitted on a steel piston-rod having a cone and nut. This recess in the central portion of the exterior of the piston is so arranged as to cover and uncover the adjusting and controlling ports in the valve-case.

In order that my invention may be readily understood, I proceed to describe the same with reference to the accompanying drawings.

Figure 2:
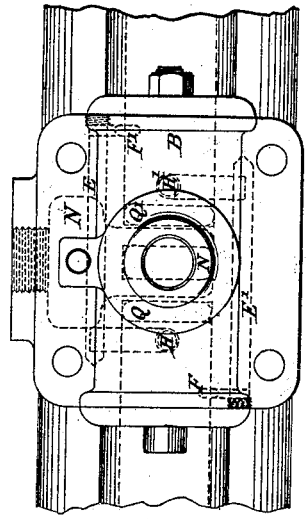
Figure 1:
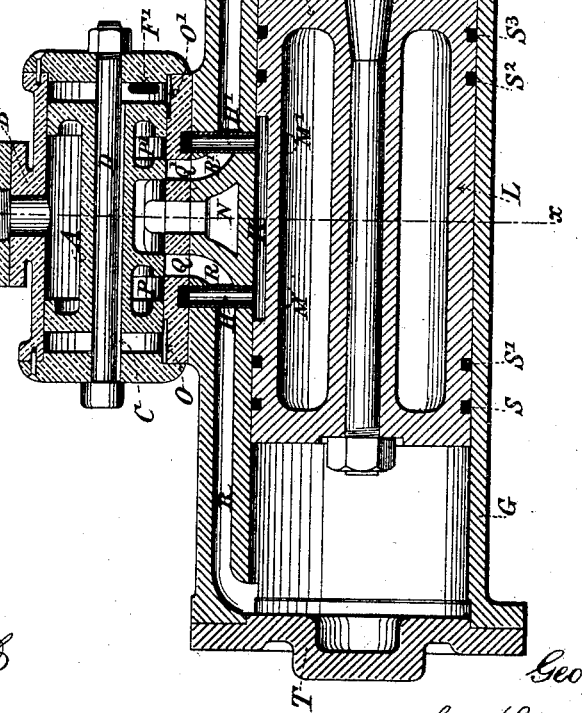

Figure 1 is a longitudinal section of a valve, cylinder, and piston constructed according to my invention. Fig. 2 is a plan, and Fig. 3 is a cross section, taken on the line $x\,x$ of Fig. 1.

A is the valve, which is circular at its ends and recessed in its center, as shown in Figs. 1 and 3, and having ports P P'. It is turned to fit the valve-case B. To prevent the valve from rotating while at work, a hole is drilled through its center longitudinally and slotted through for the feather C, which is fitted into the bar D, which passes through the valve. This bar serves the purpose of securing the covers of the valve-case and retaining the valve in its proper position when at work, and also preventing friction and wear in the valve-case. The valve-case B is provided with ports E E', Figs. 2 and 3, and ports F F', Figs. 1 and 2, for the valve. These ports lead to each end of the case, as shown by the dotted lines in plan, Fig. 2, and down into the main cylinder G, by tubular ports H H'. From this point the exhaust is carried by the recess K in the piston L to the openings M M' in the cylinder into the main exhaust-port N.

$o\,o'$ are grooves located in the bottom of the valve-chest, near the ends thereof, their object being to relieve the valve from any accumulation of water arising from the condensation of the steam, as the valve-pistons move, and said grooves, being of a length greater than the thickness of the valve-moving piston, allow the water to be forced out and escape by the cylinder. The piston L has a recess, K, in the center, which regulates the exhaust from the valve and controls its movement by opening and closing the ports and passages leading from the valve-case to the main cylinder.

In Fig. 1 the piston L and the valve A are represented in the center of the respective cylinders. To explain the working of this engine, let it be presumed that the valve A has been moved to the right, admitting steam from the valve-chest B through the ports P Q R, and the piston L has moved to the right and reached the head T'. In that position the port H has been opened and a portion of the steam in the cylinder G passes through said tubular port H, and by the ports E and F' into the right-hand end of the valve-chest B, and the pressure now moves the valve A to the left, shutting off the live steam at the port Q and opening the exhaust through R Q N, and admitting steam through P', Q', and R' to move the piston L in the opposite direction; hence the movement of the valve is dependent upon the steam from the cylinder G, and not upon the live steam from the steam-chest B, and this movement can take place because the left-hand end of the cylinder B has been opened to the exhaust *via* the ports F E' H', the recess K and port or opening M' to the exhaust-port N. At the same time that the port H is uncovered the port M is also uncovered and a portion of the steam passes through it, which assists in freeing the cylinder of steam.

When the piston L reaches the middle part of the stroke, as seen in Fig. 1, both ends of the chest B are opened to the exhaust by F F', E E', H H', K, and M M', but the valve A is not moved because the steam-pressure thereon is balanced. When the piston L reaches the left-hand end of the cylinder G, Fig. 1, the ports H' M' are opened for steam to pass by H', E', and F into the left-hand end of the valve-chest B, so that steam from the cylinder G acts to move the valve A to the right, again admitting steam by P Q R into the cylinder G, and allowing the exhaust to pass off by R' Q' to N. Steam enters the port M' at the same time as it enters H', to aid in freeing the cylinder of steam. As soon as the piston L commences to move to the right, it covers the respective ports M' H', and the operations proceed as before described.

The rings S S' S² S³ on the piston L are the ordinary Ramsbottom steel rings.

T T' are the covers of the main cylinder, and V the gland for stuffing-box, through which the piston-rod W passes.

I claim as my invention—

The combination, with the valve and its circular ends and the cylindrical valve-case, of the engine-cylinder, the main steam-ports, the exhaust-ports M M', steam-ports H H', E E', and F F', and the engine-piston L, having a recess, K, the length of said piston L being less than the distance between the pairs of ports M H and M' H', and the respective heads at the opposite ends of the steam-cylinder, so that steam from the main cylinder is allowed to pass through the port H or H' and their respective connecting-ports to move the valve, and the exhaust-port M or M' is simultaneously opened, substantially as set forth.

In witness whereof I have hereunto signed my name in the presence of two subscribing witnesses.

GEORGE THOMAS PARNELL.

Witnesses:
ERNEST DE PASS,
    68 *Fleet Street, London.*
HERBERT E. DALE,
    17 *Gracechurch Street, London, E. C.*